US006240377B1

(12) United States Patent
Kai et al.

(10) Patent No.: US 6,240,377 B1
(45) Date of Patent: May 29, 2001

(54) INTEGRATED CIRCUIT WITH EMBEDDED REPROGRAMMABLE EEPROM AND EMULATION METHOD TO FACILITATE DEBUGGING

(75) Inventors: Toshiya Kai, Osaka; Kazumi Yamada, Kyoto, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/210,985

(22) Filed: Dec. 14, 1998

(30) Foreign Application Priority Data

Dec. 18, 1997 (JP) .................................................. 9-348946

(51) Int. Cl.$^7$ .................................................. G06F 9/455
(52) U.S. Cl. .............................. 703/24; 703/25; 710/128; 711/103; 714/29; 717/11
(58) Field of Search ................. 703/23–27; 714/718, 714/28, 29, 30; 711/103; 717/4, 11; 710/128

(56) References Cited

U.S. PATENT DOCUMENTS

| | | | |
|---|---|---|---|
| 5,175,840 | * 12/1992 | Sawase et al. | 711/103 |
| 5,210,854 | * 5/1993 | Beaverton et al. | 717/11 |
| 5,581,695 | * 12/1996 | Knoke et al. | 714/28 |
| 5,701,492 | * 12/1997 | Wadsworth et al. | 717/11 |
| 5,768,563 | * 6/1998 | Porter et al. | 703/27 |
| 5,802,268 | * 9/1998 | Fisher et al. | 714/25 |
| 5,901,225 | * 5/1999 | Ireton et al. | 714/7 |
| 5,983,017 | * 11/1999 | Kemp et al. | 703/23 |
| 6,003,130 | * 12/1999 | Anderson | 713/2 |
| 6,067,593 | * 5/2000 | Schade | 710/126 |

FOREIGN PATENT DOCUMENTS 7-093177 * 7/1995 (JP) .

OTHER PUBLICATIONS

Vranken et al., "Design–for–Debug in Hardware/Software Co–Design", Proc. 5th Inter. Workshop on Hardware/Software Codesign, pp. 35–39, Mar. 1997.*

Koenemann et al., "Built–in Self–Test (BIST) in the Era of Depp Sub–Micron Technology", NORTHCON/96, pp. 312–315, Nov. 1996.*

Jones, M., "Design for Test in a Custom 8–bit Microcontroller", Colloquium on Guaranteeing the Reliability of Automotive Electronics, pp. 7/1–7/6, 1988.*

* cited by examiner

Primary Examiner—Kevin J. Teska
Assistant Examiner—Douglas W. Sergent
(74) Attorney, Agent, or Firm—McDermott, Will & Emery

(57) ABSTRACT

An E$^2$PROM controller is provided for an emulation chip. An E$^2$PROM is connected to a CPU via a memory interconnect bus. The E$^2$PROM and the CPU are also connected to each other via a peripheral circuit interconnect bus independent of the memory interconnect bus. During emulation, the emulation chip is connected to an in-circuit emulator via an emulator interconnect bus, and the memory interconnect bus is disconnected. However, the E$^2$PROM controller allows electrical communication through the peripheral circuit interconnect bus and thereby accesses the E$^2$PROM as one of peripheral circuits. Accordingly, it is possible to check out whether or not a reprogramming program stored in the E$^2$PROM is running normally.

9 Claims, 3 Drawing Sheets

INTEGRATED CIRCUIT WITH EMBEDDED REPROGRAMMABLE EEPROM AND EMULATION METHOD TO FACILITATE DEBUGGING

BACKGROUND OF THE INVENTION

The present invention relates to a semiconductor integrated circuit and an emulation method for checking out whether a program used by the integrated circuit runs normally. More particularly, the present invention relates to a scheme for enabling processing checkout of a program stored in an electrically programmable nonvolatile memory.

Generally speaking, in a conventional microcomputer with a built-in electrically erasable programmable ROM ($E^2PROM$) such as a flash memory, a writer is connected to an external pin of a chip in which the microcomputer is incorporated, and the contents stored in the $E^2PROM$ is reprogrammed by using this writer.

However, if such a chip incorporating a microcomputer with a built-in $E^2PROM$ is integrated with a circuit board, then all the external pins of the chip are occupied and the writer can't afford to be connected thereto in many cases. Accordingly, after the chip has been integrated with the circuit board, it is difficult for the writer to reprogram the $E^2PROM$.

Thus, in order to reprogram the contents of the $E^2PROM$ after the integration, a reprogramming program may be stored beforehand in the $E^2PROM$ and executed by a CPU provided for the microcomputer. When such a reprogramming method is employed, it is desirable to perform emulation for seeing if the reprogramming operation is normally performed based on the reprogramming program and altering the reprogramming program in accordance with the results of the checkout.

FIG. 3 shows the configuration of a conventional system including a semiconductor integrated circuit (emulation chip) and an in-circuit emulator. As shown in FIG. 3, this system includes: an in-circuit emulator 10 implemented as a personal computer, for example; an emulation chip 11 to be checked out by emulation; and an emulator interconnect bus 12 for connecting the in-circuit emulator 10 to the emulation chip 11. The in-circuit emulator 10 includes: an emulation circuit 18; and an emulation memory 17 such as a RAM in which a user program is stored. The emulation chip 11 includes: a CPU 13; an $E^2PROM$ 14; and peripheral circuits 15 including communications circuits, A/D converters and/or time counters. The CPU 13 and the $E^2PROM$ 14 are connected to each other by a memory interconnect bus 19, while the CPU 13 and the peripheral circuits 15 are connected to each other by a peripheral circuit interconnect bus 16. Suppose no program has been stored in the $E^2PROM$ 14 yet.

Hereinafter, the emulation operation performed by the system shown in FIG. 3 will be described. First, the emulation chip 11 is set at emulation mode, thereby allowing electrical communication through the emulator interconnect bus 12 and prohibiting communication through the memory interconnect bus 19. In such a state, the user program stored in the emulation memory 17 is provided to the CPU 13 of the emulation chip 11 to make the CPU 13 perform a simulated operation. On the other hand, while the emulation chip 11 performs a normal operation (i.e., an operation carried out based on a user program stored in the built-in $E^2PROM$ 14), the emulator interconnect bus 12 is disconnected and electrical communication through the memory interconnect bus 19 is allowed.

However, in such a conventional system, if a reprogramming program is stored in the $E^2PROM$ built in a microcomputer, it is impossible to check out whether or not the reprogramming operation is performed normally based on the reprogramming program.

More specifically, during the emulation, electrical communication is allowed through the emulator interconnect bus 12, but not through the memory interconnect bus 19 used for the normal operation. Thus, the emulation can be performed on nothing but the emulation memory 17 connected to the emulator interconnect bus 12. In addition, it is harder to reprogram the contents of an $E^2PROM$ than reprogramming the contents of a RAM or the like. And a write level should be checked to see if the reprogramming processing has been performed normally in the $E^2PROM$. By comparison, the emulation memory 17 is reprogrammable more easily than the $E^2PROM$ 14. Thus, even if it has been confirmed that reprogramming processing has been performed normally in the emulation memory 17, it is sometimes impossible to check out whether or not reprogramming processing has been performed normally in the $E^2PROM$ based on the reprogramming program.

SUMMARY OF THE INVENTION

The object of the present invention is to provide a semiconductor integrated circuit configured to check out whether or not the reprogramming program stored in an $E^2PROM$ is running normally, as well as the write level thereof, and a method for emulating the same.

In order to accomplish this object, according to the present invention, another interconnect bus is provided separately from the memory interconnect bus 19 shown in FIG. 3, thereby accessing the $E^2PROM$ using this additionally provided interconnect bus during emulation.

The semiconductor integrated circuit of the present invention includes: a CPU; electrically programmable storage means; a memory interconnect bus connecting the CPU and the storage means to each other; and another interconnect bus, also connecting the CPU and the storage means to each other and being provided independent of the memory interconnect bus. The CPU is accessible to the storage means via either the memory interconnect bus or the another interconnect bus.

In one embodiment of the present invention, the circuit further includes selection means, disposed between the CPU and the storage means, for selecting one of the memory interconnect bus and the another interconnect bus.

The method of the present invention is a method for emulating a semiconductor integrated circuit including: a CPU; electrically programmable storage means; and a memory intertoconnect bus and another interconnect bus, which both connect the CPU and the storage means to each other. In this method, the CPU accesses the storage means via the another interconnect bus during emulation.

In one embodiment of the present invention, during the emulation, the CPU transmits: an address to be accessed in the storage means; control data instructing read or write; and data to be written during writing, through the peripheral circuit interconnect bus by a time-division technique.

In another embodiment of the present invention, the address, the control data and the data to be written during writing, which have been transmitted through the peripheral circuit interconnect bus by the time-division technique, are once stored in respective registers. And the storage means is accessed based on the address and data stored.

In the configuration of the present invention, the CPU and the electrically programmable storage means are connected to each other via the memory interconnect bus and the another interconnect bus, which is disposed in parallel to the memory interconnect bus. Thus, even though the memory interconnect bus is disconnected during emulation, the storage means is still accessible through the another interconnect bus. Accordingly, it is possible to check out whether or not the reprogramming program stored in the storage means is running normally.

In particular, according to the present invention, the peripheral circuit interconnect bus is used as the another interconnect bus during emulation. This peripheral circuit interconnect bus is not divided into three buses, i.e., address, data and control buses. Instead, the address, data and control data are output to the peripheral circuit interconnect bus in a time-division fashion and then temporarily stored in respective registers. Thus, it is possible to check out whether or not the reprogramming program stored in the storage means is running normally using the peripheral circuit interconnect bus.

DESCRIPTION OF THE PREFERRED EMBODIMENTS

Hereinafter, preferred embodiments of the present invention will be described with reference to the accompanying drawings.

Figure 1:
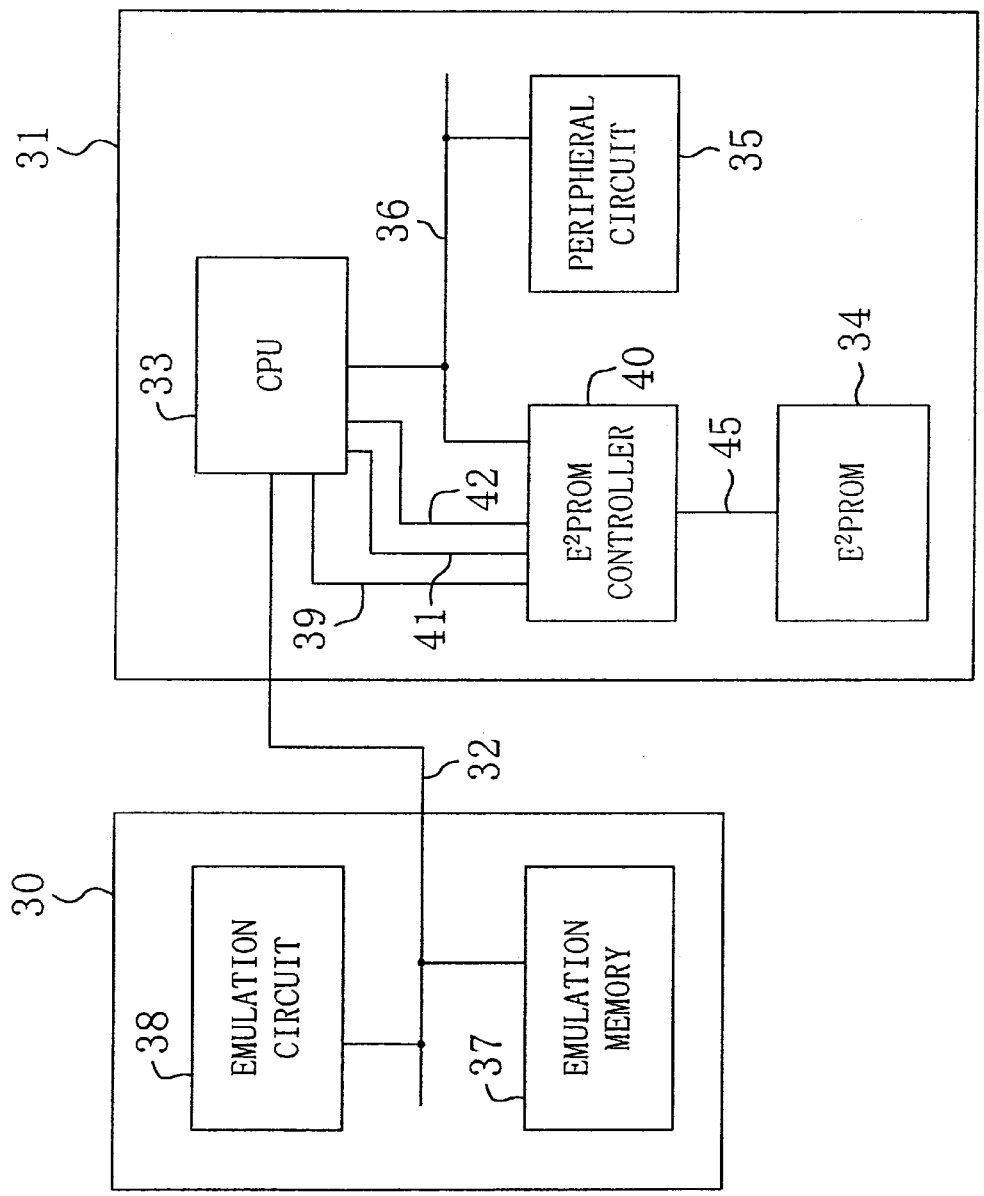
FIG. 1 is a diagram illustrating internal configurations of a semiconductor integrated circuit and an in-circuit emulator according to an embodiment of the present invention.

FIG. 1 illustrates the configurations of a semiconductor integrated circuit according to an embodiment of the present invention and an in-circuit emulator for emulating the circuit. As shown in FIG. 1, this system includes: an in-circuit emulator 30; the semiconductor integrated circuit (emulation chip) 31 to be checked out by emulation; and an emulator interconnect bus 32 for connecting the in-circuit emulator 30 to the emulation chip 31.

The emulation chip 31 includes: a CPU 33; an electrically erasable programmable ROM (E²PROM; storage means) 34; and peripheral circuits 35. The peripheral circuits 35 are connected to the CPU 33 via a peripheral circuit interconnect bus 36. A user program and a reprogramming program for reprogramming the user program are stored in the E²PROM 34.

The in-circuit emulator 30 includes: an emulation memory 37 for storing the user and reprogramming programs, which have been stored in the E²PROM 34, as programs to be checked out; and an emulation circuit 38 for providing the programs to be checked out, which have been stored in the emulation memory 37, to the CPU 33 in the emulation chip 31.

The emulation chip 31 further includes an E²PROM controller (selection means) 40 for controlling the accessibility to the E²PROM 34. The controller 40 and the CPU 33 are connected to each other via a memory interconnect bus 39. The peripheral circuit interconnect bus 36 is extended toward the E²PROM controller 40 to interconnect the CPU 33 to the E²PROM controller 40 as another interconnect bus independent of the memory interconnect bus 39. The CPU 33 outputs a mode signal 42 and a register control signal 41 to the E²PROM controller 40. The mode signal 42 indicates either emulation mode or normal operation mode (in which normal operation, not emulation, is performed based on the program stored in the E²PROM 34). The E²PROM 34 is connected to the E²PROM controller 40 via an interconnect bus 45.

Figure 2:
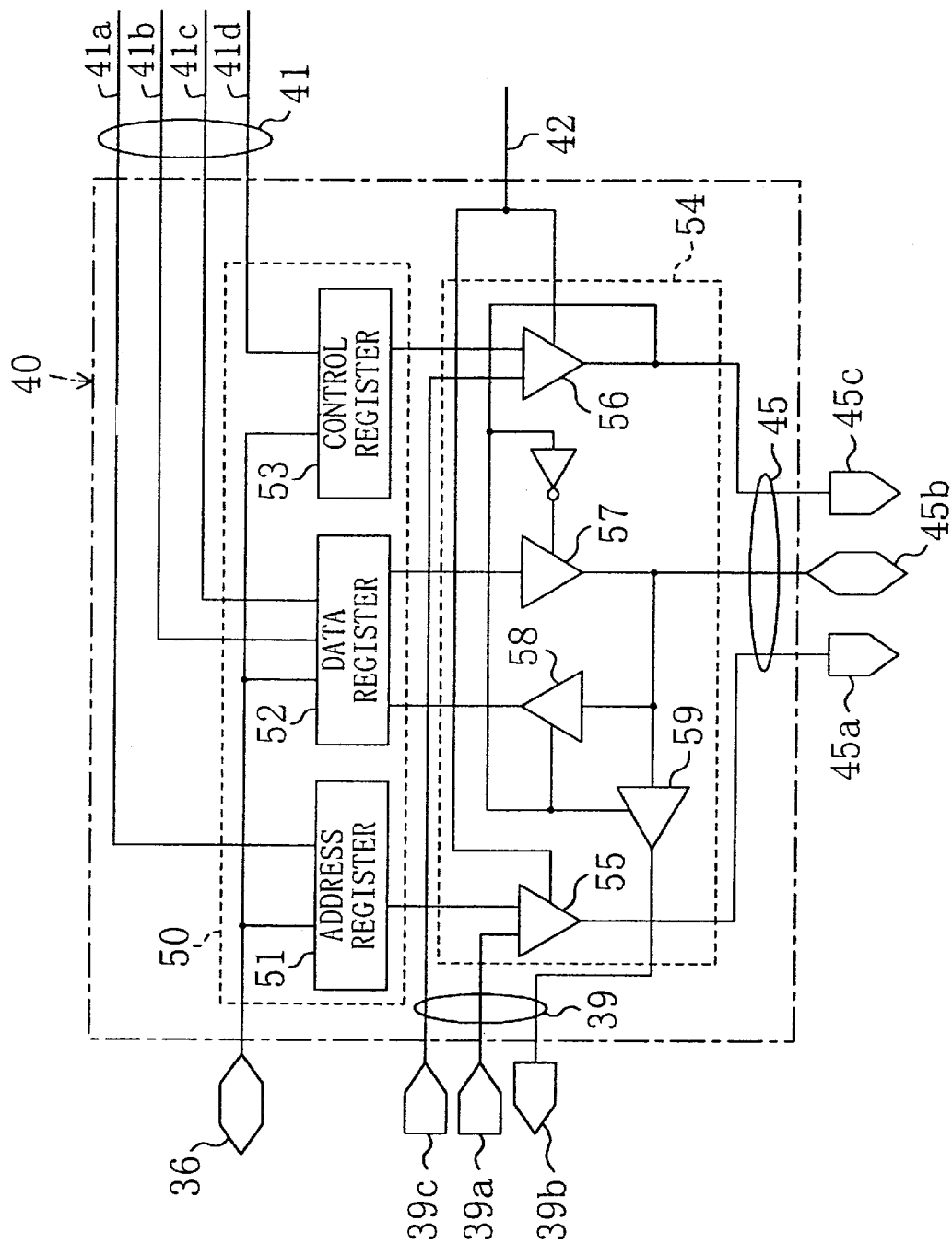
FIG. 2 is a diagram illustrating an internal configuration of an E²PROM controller included in the semiconductor integrated circuit of the embodiment.
Figure 3:
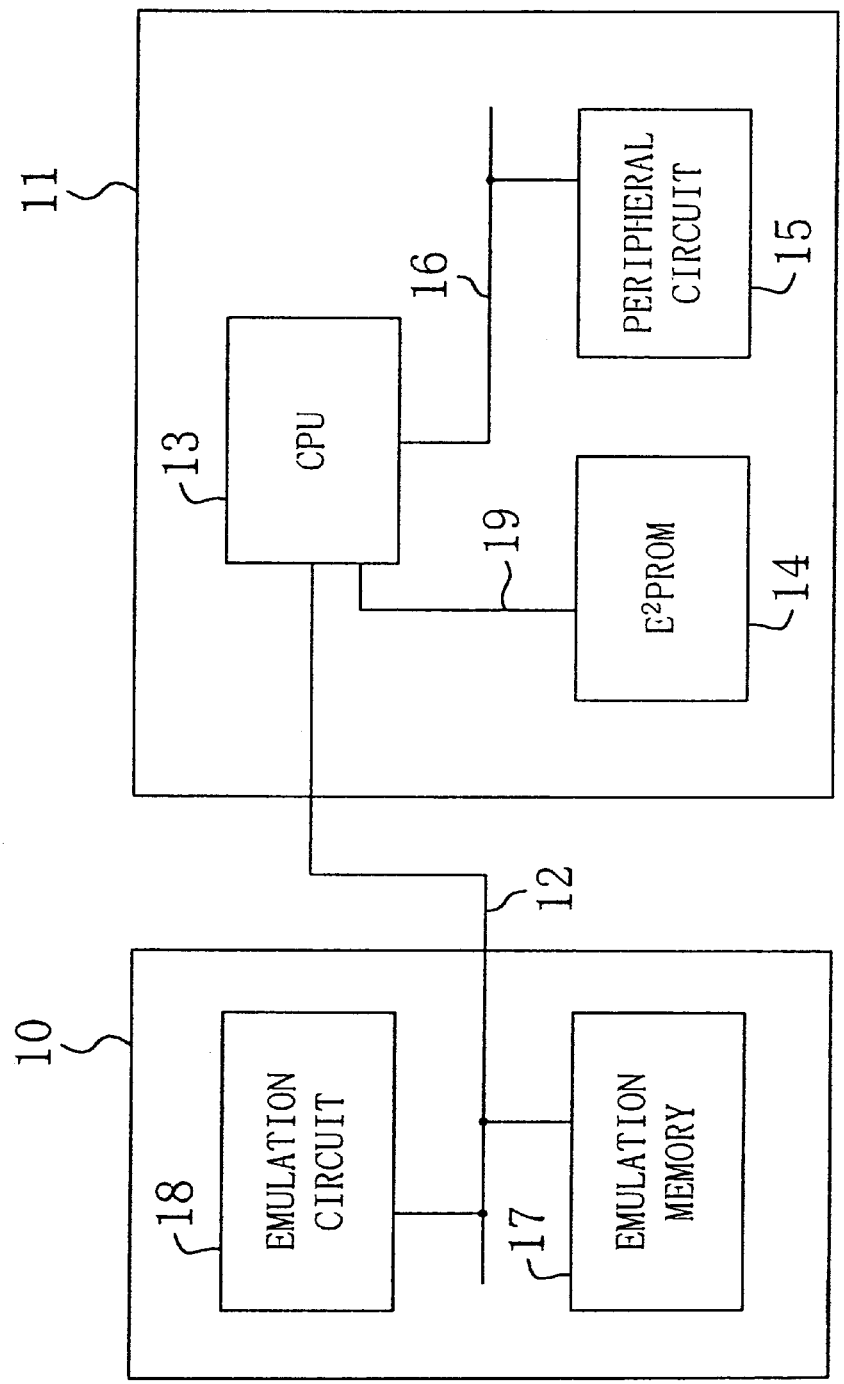
FIG. 3 is a diagram illustrating internal configurations of a conventional semiconductor integrated circuit and an in-circuit emulator.

FIG. 2 illustrates the internal configuration of the E²PROM controller 40. As shown in FIG. 2, the memory interconnect bus 39 consists of: an address bus 39a; a data bus 39b; and a control bus 39c. Also, the register control signal 41 is comprised of: an address enable signal 41a; a data read enable signal 41b; a data write enable signal 41c; and a control enable signal 41d. Further, the interconnect bus 45 between the E²PROM 34 and the E²PROM controller 40 is divided into: an address bus 45a; a data bus 45b; and a control bus 45c. However, the peripheral circuit interconnect bus 36 is not divided into three buses, i.e., the address, data and control buses, unlike the memory interconnect bus 39.

The E²PROM controller 40 shown in FIG. 2 internally includes: a set 50 of registers; and an access selection circuit 54. The set 50 of registers are provided for accessing the E²PROM 34 during emulation. The set 50 includes: an address register 51 for storing an address; a data register 52 for storing data to be written or data read out; and a control register 53 for storing control data indicating whether data should be written into or read out from the E²PROM 34. The set 50 of registers contributes to the exchange of address, data and control data between the CPU 33 and the E²PROM 34 by using the single peripheral circuit interconnect bus 36 in a time-division fashion. The peripheral circuit interconnect bus 36 is connected to these registers 51, 52, 53. The address enable signal 41a is input to the address register 51. The data read enable signal 41b and the data write enable signal 41c are input to the data register 52. And the control enable signal 41d is input to the control register 53.

In sum, the access selection circuit 54 receives the mode signal 42, and selects either the memory interconnect bus 39 or the set 50 of registers responsive to the signal 42. Specifically, if the mode signal 42 indicates emulation mode, selectors 55 and 56 of the access selection circuit 54 respectively select the address register 51 and the control register 53 from the set 50 of registers. Alternatively, if the mode signal 42 indicates normal operation mode, the selectors 55 and 56 respectively select the address bus 39a and the control bus 39c of the memory interconnect bus 39. Three tristate buffers 57, 58 and 59 are controlled by the output of the selector 56, i.e., the control data. Specifically, if the control data instructs write, the tristate buffer 57 is turned ON, thereby outputting the data, stored in the data register 52 in the set 50, to the data bus 45b of the interconnect bus 45. On the other hand, if the control data instructs read, the other two tristate buffers 58 and 59 are turned ON, thereby connecting the data bus 45b of the interconnect bus 45 to the data register 52 in the set 50 and to the data bus 39b of the memory interconnect bus 39, respectively.

Hereinafter, the semiconductor integrated circuit of this embodiment and the emulation method thereof will be described.

In this embodiment, the E²PROM controller 40 accesses the E²PROM 34 via the peripheral circuit interconnect bus 36 during emulation or the memory interconnect bus 39 during normal operation. Thus, during emulation, the E²PROM 34 is treated like one of peripheral circuits 35. This point will be described in more detail below.

1) Writing data into the E²PROM during emulation:

A mode signal 42, indicating emulation mode, is output from the CPU 33. Accordingly, in the E²PROM controller 40, the access selection circuit 54 disconnects the memory interconnect bus 39 and allows electrical communication through the peripheral circuit interconnect bus 36.

In such a state, the CPU 33 transmits an address to the peripheral circuit interconnect bus 36 and outputs the address enable signal 41a to the bus 36, thereby writing the address into the address register 51. Next, the CPU 33 transmits data to be written to the peripheral circuit interconnect bus 36 and outputs the data write enable signal 41b to the bus 36, thereby writing the data into the data register 51. Thereafter, the CPU 33 transmits control data to the peripheral circuit interconnect bus 36 to set the E²PROM 34 at write mode and outputs the control enable signal 41d to the bus 36, thereby writing the control data into the control register 53.

When the control data is output from the selector 56 as a result, the data, which has been temporarily stored in the data register 52, is written into the E²PROM 34 at the address, which has been stored in the address register 51.

2) Reading data from the E²PROM during emulation:

As in writing data into the E²PROM 34, first, when a mode signal 42, indicating emulation mode, is output, communication through the peripheral circuit interconnect bus 36 is allowed, and the CPU 33 and the E²PROM 34 are connected to each other via the interconnect buses 36 and 45.

In such a state, the set 50 of registers are controlled. The control over the address register 51 and the control register 53 are performed in the same way as writing data into the E²PROM 34. Only the data register 52 is controlled in a different manner. Specifically, the address, from which data is read out, is written into the address register 51, and control data setting the E²PROM 34 at read mode is written into the control register 53. Based on these data, the data stored in the E²PROM 34 is read out to the data register 52. Thereafter, the CPU 33 outputs the data read enable signal 41b, thereby reading out the data stored in the data register 52 via the peripheral circuit interconnect bus 36. Although the data in the E²PROM 34 is also read out through the tristate buffer 59, there is no problem because the memory interconnect bus 39 has been disconnected.

3) Normal operation:

A mode signal 42, indicating normal operation, is output from the CPU 33. As a result, in the E²PROM controller 40, the access selection circuit 54 allows communication through the memory interconnect bus 39 and disconnects the peripheral circuit interconnect bus 36.

In such a state, the CPU 33 outputs the address and the control data for reading data out from the E²PROM 34 to the address bus 39a and the control bus 39c of the memory interconnect bus 39, respectively. As a result, data, specified by the address output to the address bus 39a, is read out from the E²PROM 34 to the data bus 39b of the memory interconnect bus 39 through the data bus 45b of the interconnect bus 45 and the access selection circuit 54. The data, read out from the E²PROM 34, is also output to the data register 52 via the tristate buffer 58. However, since the CPU 33 does not output the data write enable signal 41c in this mode, the data is not written into the data register 52.

In this embodiment, the peripheral circuit interconnect bus 36 is extended to interconnect the CPU 33 to the E²PROM 34 through this bus. Alternatively, according to the present invention, another bus may be provided separately from the peripheral circuit interconnect bus 36 in order to interconnect the CPU 33 to the E²PROM 34.

What is claimed is:

1. A semiconductor integrated circuit comprising:

a CPU;

an electrically programmable storage means;

a memory interconnect bus connecting the CPU and the storage means to each other, the memory interconnect bus comprising an address bus and a data bus; and another interconnect bus, also connecting the CPU and the storage means to each other and being provided independent of the memory interconnect bus, the another interconnect bus functioning as both another address bus and another data bus, wherein the CPU is accessible to the storage means via either the memory interconnect bus or the another interconnect bus.

2. The circuit of claim 1, further comprising selection means, disposed between the CPU and the storage means, for selecting one of the memory interconnect bus and the another interconnect bus.

3. The circuit of claim 2, wherein the CPU outputs a mode signal indicating normal operation mode or emulation mode, and wherein the selection means receives the mode signal from the CPU and selects the another interconnect bus if the mode signal indicates the emulation mode or the memory interconnect bus if the mode signal indicates the normal operation mode.

4. The circuit of claim 3, further comprising:

a peripheral circuit; and a peripheral circuit interconnect bus connecting the CPU to the peripheral circuit, wherein the another interconnect bus is an extension of the peripheral circuit interconnect bus.

5. The circuit of claim 4, wherein the CPU outputs data through the peripheral circuit interconnect bus during the emulation mode, and wherein the selection means includes a plurality of registers connected to the peripheral circuit interconnect bus, and wherein if the mode signal indicates the emulation mode, the registers store the data output from the CPU to the peripheral circuit interconnect bus, and the data stored in the registers is output to the storage means, whereby the storage means is accessed.

6. A method for emulating a semiconductor integrated circuit, the circuit comprising:

a CPU;

an electrically programmable storage means; and a memory interconnect bus and another interconnect bus, which both connect the CPU and the storage means to each other, the memory interconnect bus comprising an address bus and a data bus and the another interconnect bus functioning as both another address bus and another data bus wherein the CPU accesses the storage means via the another interconnect bus during the emulation mode.

7. The method of claim 6, wherein the semiconductor integrated circuit further comprises:

a peripheral circuit; and a peripheral circuit interconnect bus connecting the CPU to the peripheral circuit, wherein the CPU accesses the storage means by using the peripheral circuit interconnect bus as the another interconnect bus during the emulation mode.

8. The method of claim 7, wherein, during the emulation mode, the CPU transmits: an address to be accessed in the storage means; control data instructing read or write; and data to be written when write is instructed, to the peripheral circuit interconnect bus by a time-division technique.

9. The method of claim 8, wherein the address, the control data and the data to be written during writing, which have been transmitted to the peripheral circuit interconnect bus by the time-division technique, are temporarily stored in respective registers, and wherein the storage means is accessed based on the address and data stored.

* * * * *